United States Patent
Taketsugu

Patent Number: 5,812,949
Date of Patent: Sep. 22, 1998

[54] METHOD FOR CALLING A MOBILE TERMINAL IN A MOBILE COMMUNICATION SYSTEM AND A DEVICE THEREOF

[75] Inventor: Masanori Taketsugu, Tokyo, Japan

[73] Assignee: NEC Corporation, Tokyo, Japan

[21] Appl. No.: 532,889

[22] Filed: Sep. 22, 1995

[30] Foreign Application Priority Data

Sep. 28, 1994 [JP] Japan ................................ 6-232747

[51] Int. Cl.$^6$ .................................................. H04Q 7/24
[52] U.S. Cl. .................... 455/439; 455/435; 455/560; 455/561
[58] Field of Search ................ 379/59, 58; 455/33.1, 455/54.1, 422, 432, 435, 437, 439, 438, 442, 560, 550, 424, 436, 415

[56] References Cited

U.S. PATENT DOCUMENTS 5,305,466  4/1994  Taketsugu ........................ 455/33.1

FOREIGN PATENT DOCUMENTS 3-289898  12/1991  Japan .

Primary Examiner—Edward F. Urban
Assistant Examiner—Keith Ferguson
Attorney, Agent, or Firm—Ostrolenk, Faber, Gerb & Soffen, LLP

[57] ABSTRACT

A mobile exchange office stores an identifier of a base station corresponding to an identifier of each mobile terminal. The base station stores identifiers of base stations corresponding to an identifier of a mobile terminal except for own identifiers. Receiving a call signal for a mobile terminal, the mobile exchange office searches an identifier of a base station corresponding to the mobile terminal based on this call signal and sends a call signal to a base station in accordance with this searched identifier. The base station determines a sender of the call signal. If the sender is a mobile exchange office, the base station transfers the call signal to another base station corresponding to a stored identifier and calls the mobile terminal in own radio zone. If the sender is a base station, it calls the mobile terminal in own radio zone.

12 Claims, 12 Drawing Sheets

A1 to A3: LOCATION REGISTRATION AREA
BS1 to BS9: BASE STATION
51 to 59: RADIO ZONE

A1 to A3: LOCATION REGISTRATION AREA
BS1 to BS9: BASE STATION
51 to 59: RADIO ZONE

| MOBILE TERMINAL IDENTIFIER | REGISTRATION IDENTIFIER |
|---|---|
| IMS1 | IBS2 |
| ⋮ | ⋮ |

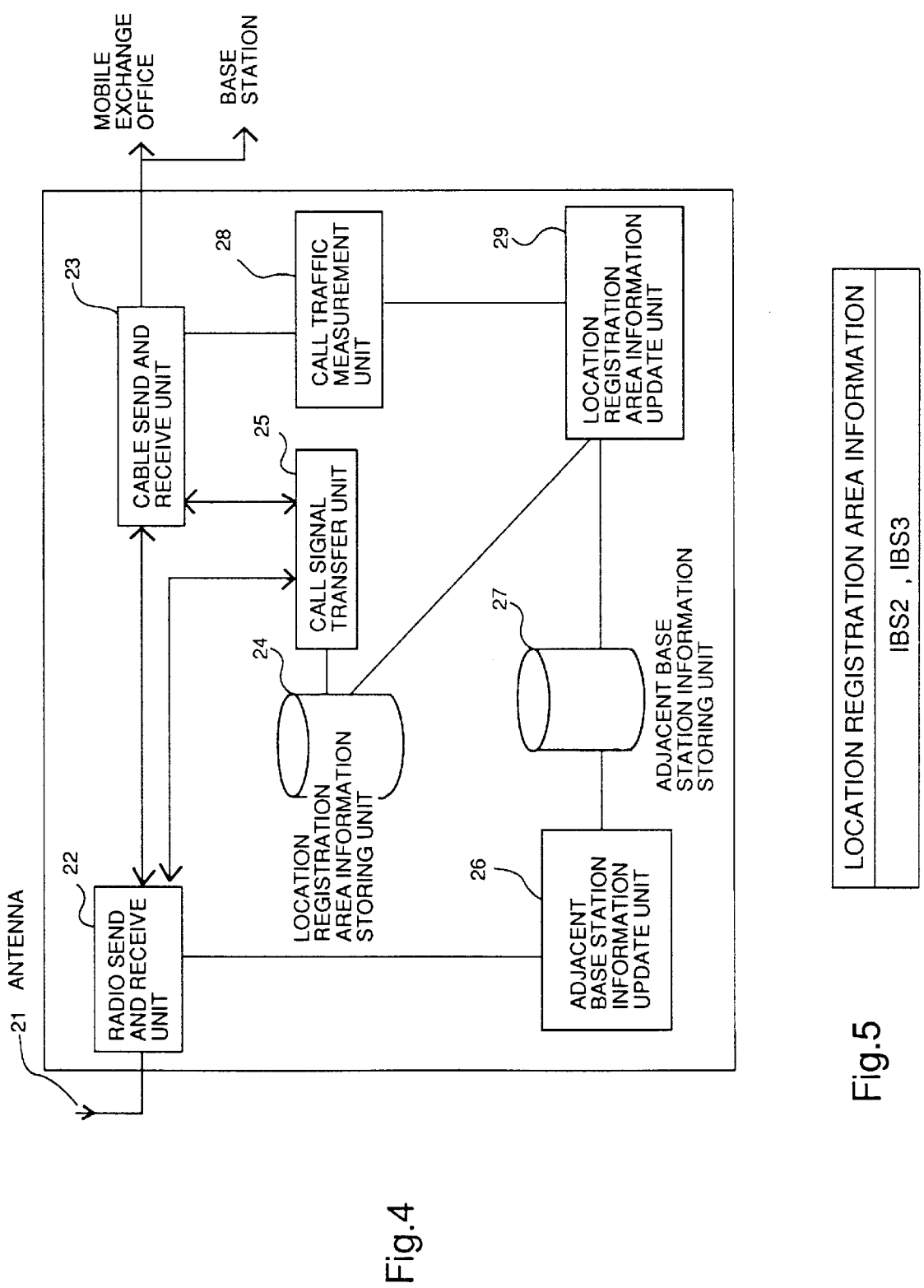

Fig.6

| BASE STATION IDENTIFIER | CUMULATIVE COUNT |
|---|---|
| IBS1 | COUNT |
| IBS2 | COUNT |
| ⋮ | COUNT |
| IBSi | COUNT |
| ⋮ | ⋮ |

METHOD FOR CALLING A MOBILE TERMINAL IN A MOBILE COMMUNICATION SYSTEM AND A DEVICE THEREOF

BACKGROUND OF THE INVENTION

The present invention relates to a method for calling a mobile terminal in a mobile communication system and a device using the calling method and, more particularly, to a method and a device thereof for calling a mobile terminal locating in a location registration area comprising a plurality of radio zones.

A conventional mobile communication system such as a cellular phone or a portable phone has employed a small zone system which covers its whole service areas by a plurality of radio zones.

The radio zone refers to a range where a radio channel communication is executed between each base station and a mobile terminal (a radio terminal or a portable phone) equipped in an automobile and so on.

Each radio zone has one base station placed therein. A plurality of mobile terminals are allowed to move in or out of any radio zones.

The mobile communication system employing the small zone system requires each mobile terminal to register the radio zone in which it currently locates so as to inform the base station of its current location for a call reception.

In order to prevent the control signal traffic for location registration, a plurality of location registration areas are set by dividing the whole service area into groups of some adjacent radio zones.

The mobile terminal registers its location at every movement to the location registration area. The information on the location registration area to which the mobile terminal belongs is reported to a mobile exchange office and stored.

Receiving a call for a mobile terminal, the mobile exchange office sends a call signal to all base stations within a location registration area to which the mobile terminal belongs. Responding to the call signal, all base stations begin to execute simultaneous calling to the addressed mobile terminal.

The number of radio zones that belong to a location registration area is increased when the number of location registration signals has increased. While, the number of radio zones that belong to a location registration area is decreased when the number of call signals has increased.

FIG. 10 is a block diagram of a method for controlling mobile communication channel disclosed in a Japanese Patent Laid Open No. 289898 (1991). A function of a mobile exchange office 1A of FIG. 10 is divided into a mobile communication gateway exchange office, a location control means and a mobile communication exchange office.

Referring to FIG. 10, the mobile communication system divides a specific field into a plurality of radio zones 51 to 59, and disposes base stations BTS1 to BTS9 to cover the respective radio zones.

In addition, a mobile exchange office 1A for controlling those base stations BTS1 to BTS9 is provided in the mobile communication system.

The mobile exchange office 1A is connected to a public channel network 3 and to a mobile exchange office 2A for controlling other base stations (not shown). A mobile exchange office 2A has the same function as that of the mobile exchange office 1A.

A mobile terminal 4 in the form of an automotive cellular phone or a portable phone is allowed to communicate with another subscriber connected to the public channel network 3 or the mobile exchange office 2A via a base station (if the mobile terminal 4 locates in a radio zone 52, its base station is BTS2.) placed corresponding to the radio zone (the radio zone 52) in which it locates and the mobile exchange office 1A.

The radio zones 51 to 59 in FIG. 10 are grouped into location registration areas A1 to A3. That is, the radio zones 51 to 53 belong to the location registration area A1. The radio zones 54 to 56 likewise belong to the location registration area A2. The radio zones 57 to 59 belong to the location registration area A3.

When the mobile terminal 4 moves from one location where location registration is covering the respective base stations BTS1 to BTS9 to its adjacent location registration area, it sends a location registration signal to the mobile exchange office 1A via the base station where the location is registered.

FIG. 11 is a block diagram of an example of a construction of the mobile exchange office 1A shown in FIG. 10. FIG. 12 is a block diagram of an example of a construction of the base station BTS1 shown in FIG. 10. The mobile exchange office 2A has the same construction as that shown in FIG. 11 and is connected to base stations (not shown).

The base stations BTS2 to BTS9 have the same construction as that of the base station BTS1 shown in FIG. 12.

Supposing that there are N sets of the mobile terminal 4 shown in FIG. 10, mobile terminal identifiers IBTS1, IBTS2, . . . and IBTSN are preliminary allocated to each mobile terminal.

The base station BTS1 to BTS9 have their own registration identifiers IBTS1 to IBTS9 allocated thereto, respectively.

Referring to FIG. 11, the mobile exchange office 1A comprises a location registration information storing unit 12A which stores location registration information representing correlation among the mobile terminal identifiers of the mobile terminal 4, location registration area to which the mobile terminal 4 belongs and registration identifier of the base station belonging to the location registration area. The mobile exchange office 1A further comprises a mobile exchange unit 11A connected to the base stations BTS1 to BTS9 as well as the public channel network and other mobile exchange office 2A for calling the addressed mobile terminal 4 by referring the content of the received call from the public channel network or the mobile exchange office, and updating the content of the location registration storing unit 12A upon receiving the location registration signal from the mobile terminal 4 via the base station.

The base station BTS1 shown in FIG. 12 comprises a cable send and receive unit 23A connected to the mobile exchange office 1A for receiving a signal including the call signal sent from the mobile exchange office 1A and sending the signal output from the radio send and receive unit to the mobile exchange office 1A. The BTS1 further comprises a radio send and receive unit 22A for sending an output of the cable send and receive unit 23A via a radio channel and outputting a signal sent from the mobile terminal 4 to the cable send and receive unit 23A.

FIG. 13 is a flowchart showing a calling process executed in the mobile communication system shown in FIG. 10. FIG. 14 is a flowchart showing a location registration process executed in the mobile communication system shown in FIG. 10.

Referring to FIG. 13, the process for calling the mobile terminal in the mobile communication system shown in FIG. 10 is described.

If the mobile exchange office 1A receives a call addressed to a mobile terminal 4 from the public channel network 3 (step 91), a mobile exchange unit 11A reads out a location registration area code representing the registered identifier contained in the received call by referring the content of the location registration information storing unit 12A (step 92). It further reads out registration identifiers allocated to all the base stations contained in the location registration area (step 93).

The mobile exchange office 11A sends a call signal to all the base stations (BTS1 to BTS3) allocated to the registration identifiers which have been read out (step 94). That is, simultaneous read out is executed.

The base stations (BTS1 to BTS3 in FIG. 10) which receive the above call signal send a call signal to the mobile terminal 4 in return (step 95).

A location registration process executed in the mobile communication system shown in FIG. 10 is described referring to FIG. 14.

The mobile terminal 4 stores the location registration area where it currently locates. When moving to the adjacent location registration area, the mobile terminal 4 sends a location registration signal containing a mobile terminal identifier which has been preliminary allocated thereto (step 101).

If one or more base stations, for example, the base stations BTS1, BTS2 and BTS4 receive the location registration signal, they add their registration identifiers to the received location registration signal and transfer them as location registration signals to the mobile exchange office 1A (step 102).

Receiving the location registration signal from those base stations BTS1, BTS2 and BTS4, the mobile exchange office 1A compares the level of the respective location registration signals, and select the location registration system with the highest level (step 103). Assuming that the base station which has sent the location registration signal with the highest level is, for example, the BTS2 which has sent the location registration signal with the highest level compared with those from the BTS1 and BTS4, it is determined that the mobile terminal locates in the location registration area containing the base station BTS2. The location registration information representing the correlation between the location registration area A1 containing the mobile terminal identifier allocated to the addressed mobile terminal and registration identifiers IBTS1, IBTS2 and IBTS3 of the base stations BTS1, BTS2 and BTS3 in the radio zone covered by the location registration area A1 is updated and stored in the location registration information storing unit 12A (step 104).

The mobile exchange office 1A generates a location registration confirmation signal of the mobile terminal 4 and send it to the base station BTS2 (step 105).

Receiving the location confirmation information signal, the base station BTS2 transfers this location registration confirmation signal to the mobile terminal 4 (step 106).

Receiving the location registration confirmation signal, the mobile terminal 4 stores its contents, i.e., the location registration area contained in the location registration confirmation signal (step 107).

FIG. 15 is a flowchart of a channel establishment process in the mobile communication systems of both a prior art and the present invention.

Referring to FIG. 15, upon receiving a call signal, the mobile terminal 4 outputs a response signal in a predetermined manner (step 81).

If a plurality of base stations, for example, BTS2 and BTS3, receive the response signal, they add their own registration identifiers to the response signal, respectively, as response signals, then transfer them to the mobile exchange office 1A (step 82).

The mobile exchange office 1A compares levels of a plurality of received response signals and selects a response signal at the highest level sent from, for example, the BTS2 (step 83).

If the received signal level is equal to or higher than a predetermined level, the mobile exchange office 1A establishes a channel connecting to the base station which has sent the selected response signal for communication. (step 85).

If the received signal level is lower than the predetermined level at step 84, the mobile exchange office 1A stops setting the channel (step 86).

The above-mentioned processes for calling, channel setting, and location registration based on the call reception are executed with a predetermined control channel.

With the above-mentioned conventional method and its unit for calling a mobile terminal in a mobile communication system, if a call for a mobile terminal is received by a mobile exchange office of the mobile communication system, the mobile exchange office sends call signals to all the base stations contained in the location registration area including the radio zone where the addressed mobile terminal currently locates.

In case calls for a plurality of mobile terminals are received by a single mobile exchange office, i.e., a communication conflict occurs, the calling processes to the mobile terminals should be executed simultaneously. This may cause the process for subsequent calling reception to take a long time.

Since a tolerance limit is set with respect to the time frame from a call reception to channel connection after finishing the process, enlarging the facility of the mobile exchange office is inevitable for satisfying the requirement.

SUMMARY OF THE INVENTION

It is an object of the invention to provide a technology for solving the above-mentioned problems.

It is another object of the invention to provide the technology for reducing location registration information amount stored in a mobile exchange office in a mobile communication system.

It is still another object of the invention to provide the technology for reducing a load accompanied by a calling process of the mobile exchange office in the mobile communication system.

The above-mentioned objects of the present invention are achieved by a method for calling a mobile terminal in a mobile communication system with a plurality of radio zones each of the radio zones has a base station, the method comprising steps of: making a base station store identifiers of predetermined base stations except for own identifier; making a mobile exchange office controlling the plurality of base stations store an identifier of a mobile terminal and an identifier of a base station where these two identifiers are corresponding each other; making the mobile exchange office search an identifier of a mobile terminal from among stored identifiers when the mobile exchange office has received a call signal for the mobile terminal, making the mobile exchange office search an identifier of a base station corresponding to the searched identifier from among the stored identifiers; making the mobile exchange office send the call signal for the mobile terminal to a base station of which identifier has been searched; making a base station discriminate a sender of the call signal when the base station has received the call signal; making a base station call the mobile terminal in a radio zone belonging the base station and transfer the call signal to a base station of which identifier is stored; and making a base station call the mobile terminal in a radio zone belonging the base station when a sender of the call signal is the base station.

Furthermore, the above-mentioned objects of the present invention are achieved by a mobile communication system having a plurality of base stations provided in respective radio zones and a mobile exchange office for controlling the plurality of base stations, and calling a mobile terminal via the base station when the mobile exchange office has received a call signal for the mobile terminal, the mobile communication system having: the mobile exchange office comprising: first storing means for storing an identifier of each mobile terminal and an identifier of a base station, wherein these two identifiers are corresponding each other; and means for searching an identifier of a base station corresponding to an identifier of a mobile terminal from the first storing means when having received a call signal for the mobile terminal, and sending the call signal for the mobile terminal to a base station of which identifier has been searched; and the base stations, each of the base stations comprising: second storing means for storing identifiers of the base stations except for own identifier; means for discriminating a sender of a call signal; and means for transferring the call signal to a base station of which identifier is stored in the second storing means and calling a mobile terminal in a radio zone belonging the base station when a sender of the call signal is the mobile exchange office, and calling the mobile terminal in a radio zone belonging the base station when a sender of the call signal is a base station except the base station.

In the present invention, the mobile exchange office stores the location registration information in which a mobile terminal identifier is correlated with a registration identifier of a base station in a radio zone holding the mobile terminal having the above-identified mobile terminal identifier.

Compared with the prior art for storing location registration areas and all the registration identifiers of base stations belonging to this location registration area which have been correlated with mobile terminal identifiers, the present invention reduces the location registration information amount and memory size of a storing unit of the mobile exchange office, thus a construction of the mobile exchange office is simplified.

In the present invention, responding to the receipt of a call by the mobile exchange office, only one base station corresponding to the mobile terminal identifier of the addressed mobile terminal is read out from location registration information within the mobile exchange office. Then a call signal is sent only to the corresponding base station. Receiving the call signal, the base station transfers the signal to another base station which has been preliminary stored for simultaneous calling to the mobile terminals.

The load accompanied by the calling process of the mobile exchange office is reduced and its process is partially executed by the base station. Therefore even if a plurality of calls for different mobile terminals are received, calling processes may be executed to mobile terminals as many as possible at a unit of time.

BRIEF DESCRIPTION OF THE DRAWINGS

This and other objects, features and advantages of the present invention will become more apparent upon a reading of the following detailed description and drawings, in which:

FIG. 4 is a block diagram of a construction of a base station of the present embodiment;

FIG. 5 is an explanatory view showing a content of location registration area information stored in the location registration area information storing unit;

FIG. 6 is an explanatory view showing an appearance frequency of an identifier of a radio relay station;

DESCRIPTION OF THE PREFERRED EMBODIMENTS

Figure 1:
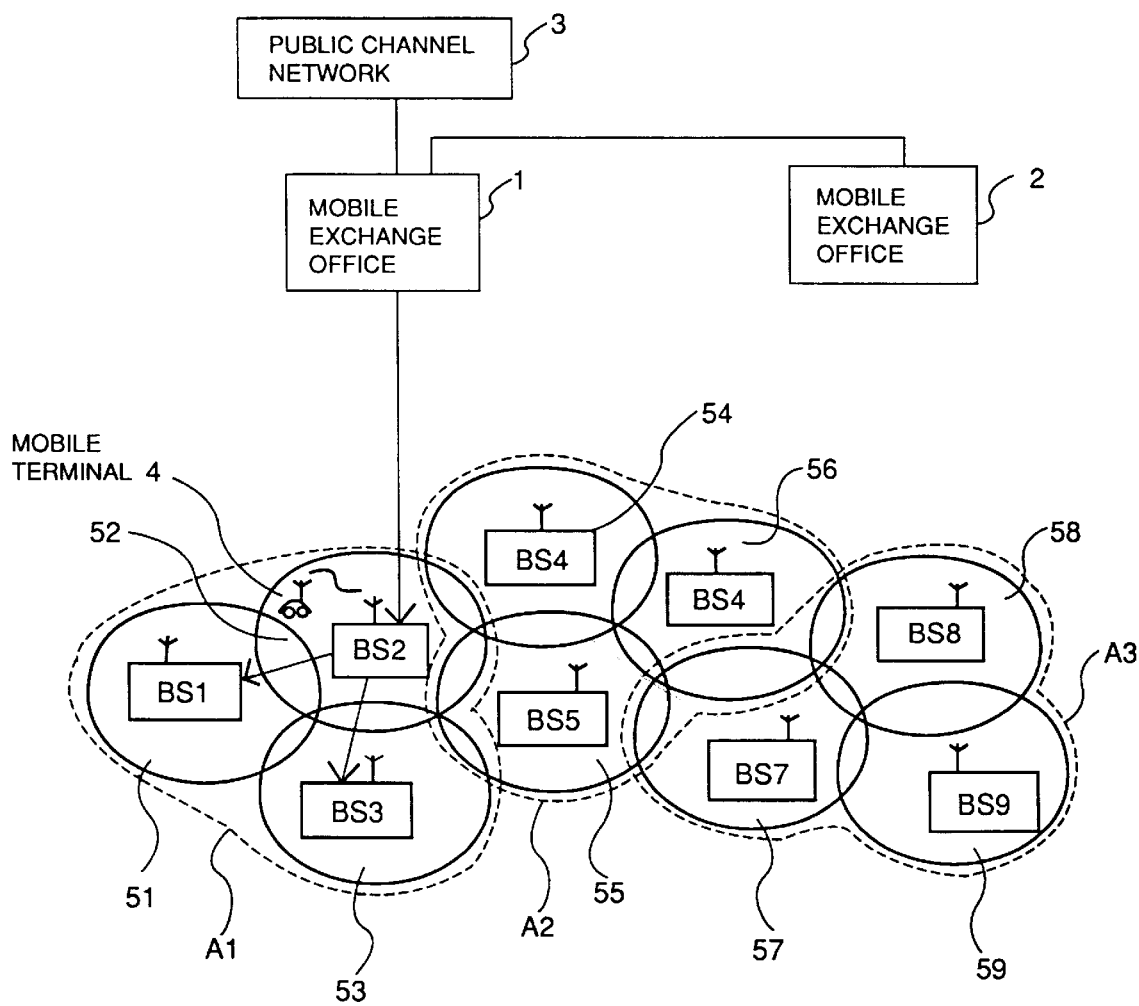
FIG. 1 is a construction view of a mobile communication system of the present embodiment.

An embodiment of the present invention is described referring to the drawings.

Figures 2, 3:
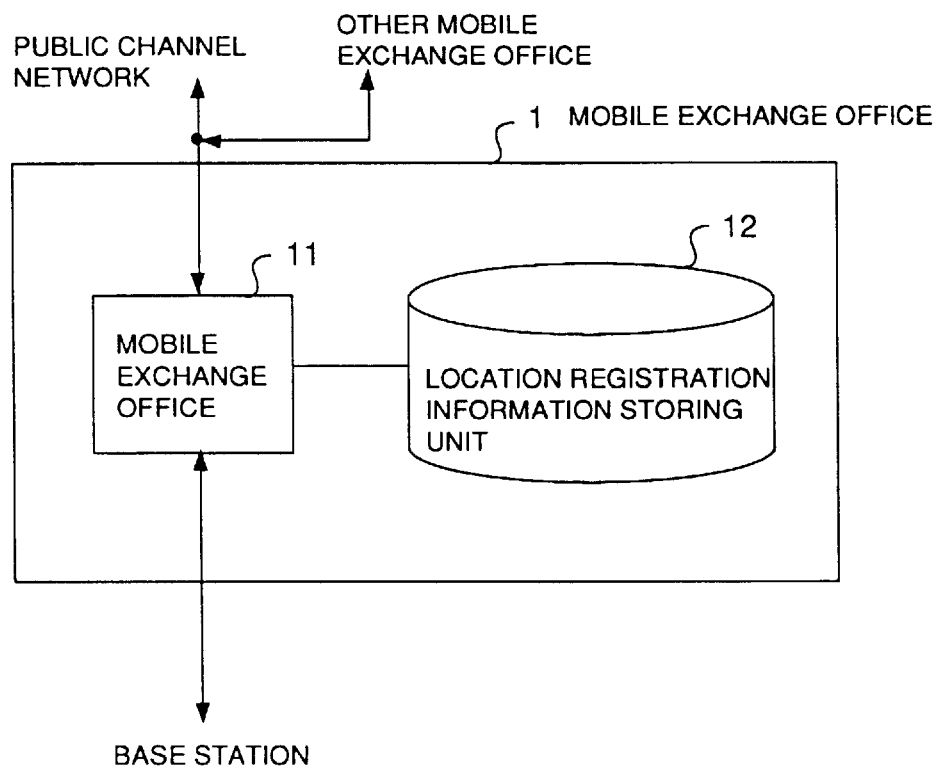
FIG. 2 is a block diagram of a construction of a mobile exchange office of the present embodiment.
FIG. 3 is an explanatory view showing a content of location registration information stored in the location registration information storing unit.

FIG. 1 is a construction view of a mobile communication system of the present embodiment. FIG. 2 is a block diagram showing a construction of a mobile exchange office in the mobile communication system of the present embodiment. FIG. 3 is an explanatory view showing a content of location registration information stored in a location registration area information storing unit. FIG. 4 is a block diagram of construction of a base station of the present embodiment. FIG. 5 is an explanatory view showing content of location registration area information stored in the location registration area information storing unit.

The mobile communication system of the embodiment has the same construction as that of the above-mentioned conventional mobile communication system except that mobile exchange offices 1 and 2 are employed instead of 1A and 2A and base stations BS1 to BS9 are employed instead of BTS1 to BTS9.

The base stations BS1 to BS9 have registration identifiers IBS1 to IBS9 allocated thereto, respectively. The mobile terminal 4 has a mobile terminal identifier IMS1 allocated thereto.

If there are plurality of the mobile terminals 4 (for example, "n" sets), the different mobile terminal identifiers have been preliminary allocated to the "n" sets of the mobile terminals 4, respectively.

As FIG. 2 shows, the mobile exchange office 1 comprises a mobile exchange unit 11 connected to a public channel network 3, another mobile exchange office (for example, a mobile exchange office 2) and the base stations BS1 to BS9, and a location registration information storing unit 12 connected to the mobile exchange unit 11 for storing the location registration information.

The location registration information storing unit 12 stores the location registration information representing correlation between a mobile terminal identifier of the mobile terminal and an identifier of a base station at which every mobile terminal locates and registers in location registration areas A1 to A3 under the control of the mobile exchange office 1.

FIG. 3 shows the content of the location registration information stored in the location registration information storing unit 12 when the mobile terminal 4 having a mobile terminal identifier IMS1 registers its location in the base station BS2 having a registration identifier of IBS2. Updating of the location registration information is described later.

The mobile exchange office 2 has the same construction as that of the mobile exchange office 1.

Next, a construction of the base station is described referring to an example using the base station BS1.

In FIG. 4, a reference numeral 22 is a radio send and receive unit for transmitting/receiving signals to/from the mobile terminal 4.

A reference numeral 21 is an antenna connected to the radio send and receive unit 22 for communicating with the mobile terminal 4.

A reference numeral 23 is a cable send and receive unit for outputting a signal received by an antenna 21 to the mobile exchange office 1. Receiving a signal from the mobile exchange office 1 and other base stations (e.g., base station BS2), the cable send and receive unit 23 outputs a signal to the radio send and receive unit 22 or a call signal transfer unit 25 (described later) depending on the content of the received signal.

A reference numeral 24 is a location registration area information storing unit for storing the location registration area information representing registration identifiers of other base stations to which the call signal sent from the mobile exchange office 1 should be transferred. Upon receiving a call signal from the mobile exchange office 1, the location registration area information is stored within the location registration area information storing unit 24 in such a manner that each registration identifier of the base station to which a call signal received from the mobile exchange office 1 should be transferred is marked off with a comma. FIG. 5 shows that the call signal is transferred from the base station BS2 to base stations BS1 and BS3.

A reference numeral 25 is a call signal transfer unit for outputting a signal by determining a sender of the call signal, i.e., whether the call signal received from the cable send and receive unit 23 has been sent from the mobile exchange office or other base station, (e.g., base station BS3).

A reference numeral 26 is an adjacent base station information update unit for outputting an identifier of each base station extracted from path information sent from the mobile terminal to an adjacent base station information storing unit. The path information is well-known for being transmitted when the mobile terminal executes location registration, which has been disclosed in the U.S. Pat. No. 5,305,466.

A reference numeral 27 is an adjacent base station information storing unit for calculating appearance frequency of the identifier of the radio relay station output from the adjacent base station information update unit 26, and stores the frequency information as shown in FIG. 6.

A reference numeral 28 is a call traffic measurement unit for measuring traffic of the call signal among those received by the cable send and receive unit 23.

Figure 7:
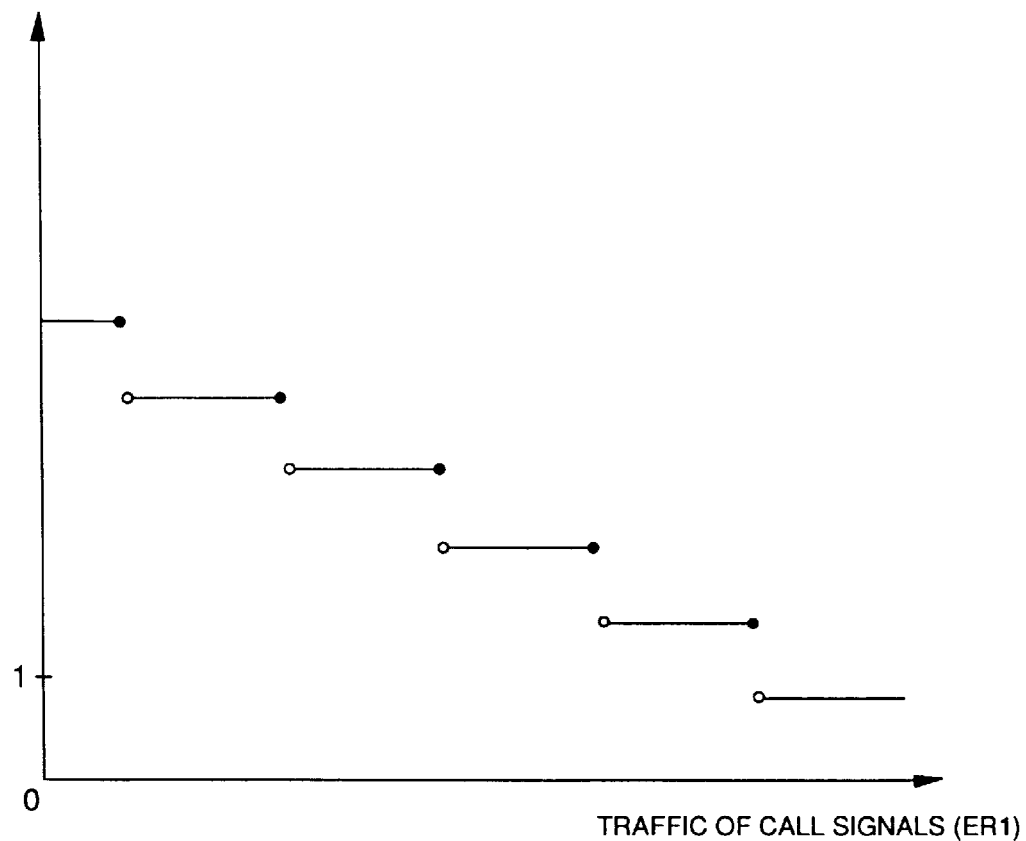
FIG. 7 is a graphical view showing a correlation between traffic of a call signal and the number of base stations.

A reference numeral 29 is a location registration area information update unit for updating the stored content of the location registration area information storing unit 24. The location registration area information update unit 29 determines the number of the identifiers of the base station, "n", based on the measurement results of the call traffic measurement unit 28 and a correlation as shown in FIG. 7. Among information stored in the adjacent base station information storing unit 27, "n" identifiers are selected sequentially in order of the greatest appearance frequency. Then the stored content of the location registration area information storing unit 24 is updated into the selected identifiers.

This embodiment presents a method for measuring the call signal traffic as a method for updating the location registration area. Other methods, for example, for using traffic of the location registration signal are available. An explanation of the above method is omitted because detailed description has been disclosed in the U.S. Pat. No. 5,305,466.

A specific function of the embodiment is described referring to flowcharts.

Figure 8:
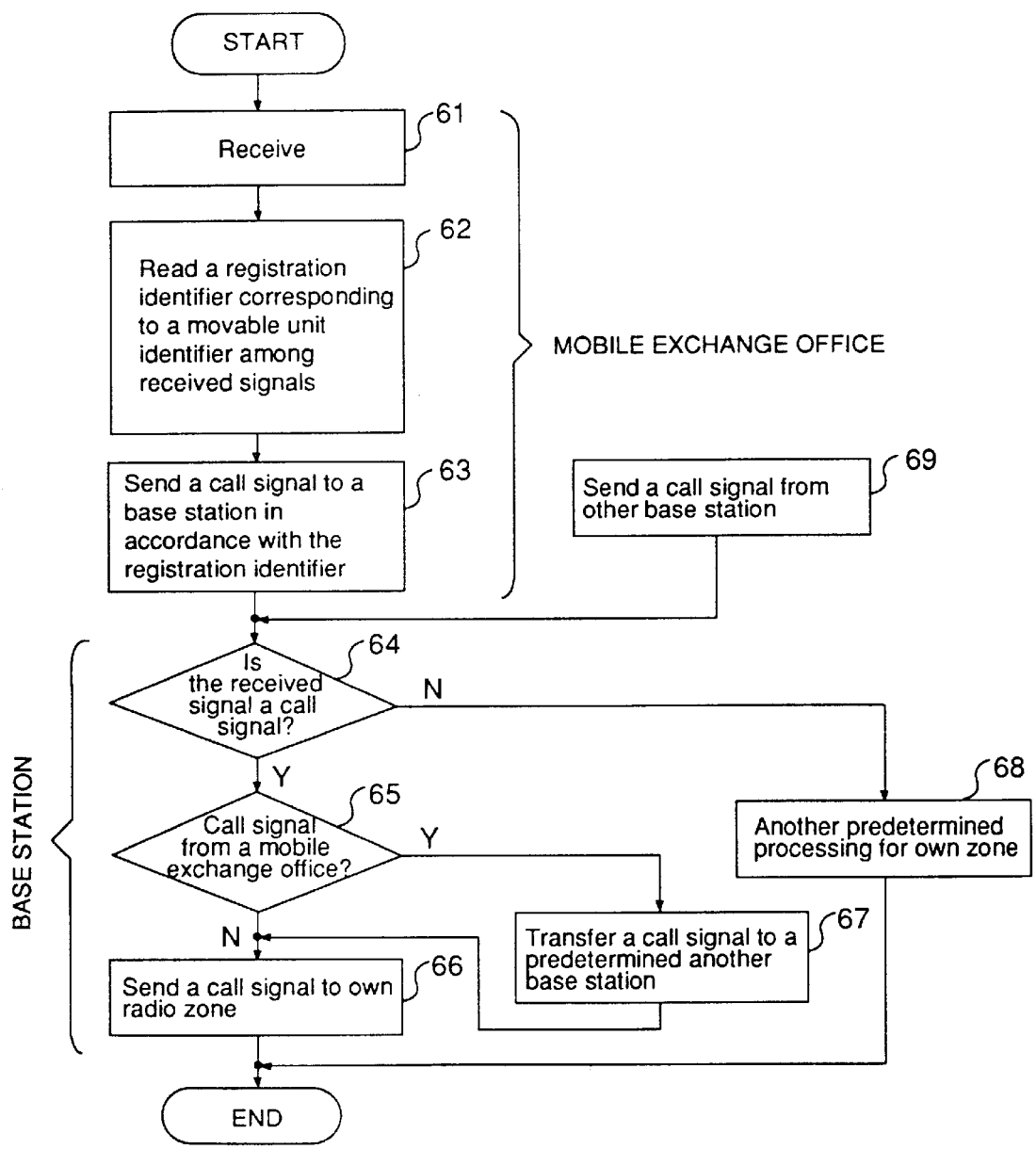
FIG. 8 is a flowchart showing a calling process of the present embodiment.

FIG. 8 is a flowchart showing a calling process of the mobile communication system of the present embodiment.

Figure 9:
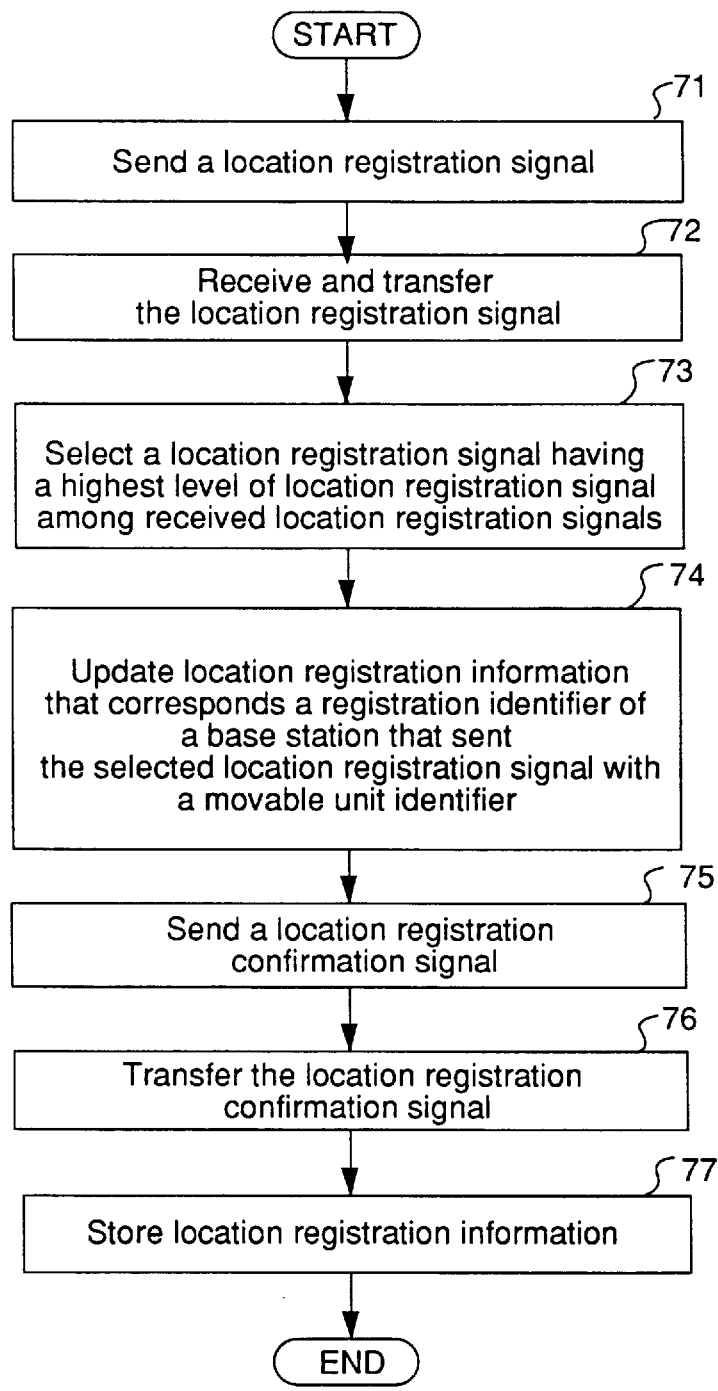
FIG. 9 is a flowchart showing a location registration process of the present embodiment.
Figure 10:
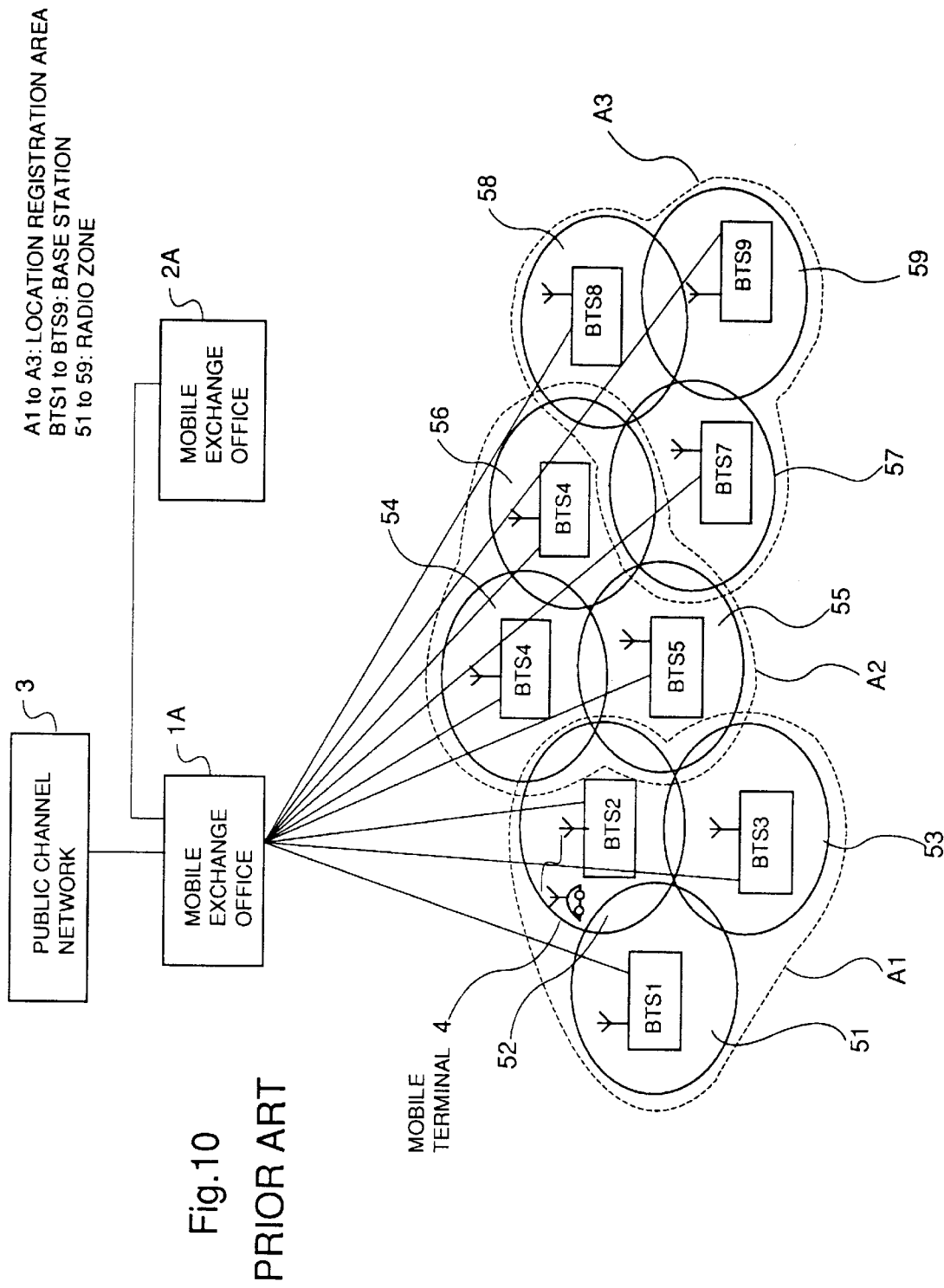
FIG. 10 is a construction view of a conventional mobile communication system.
Figure 11:
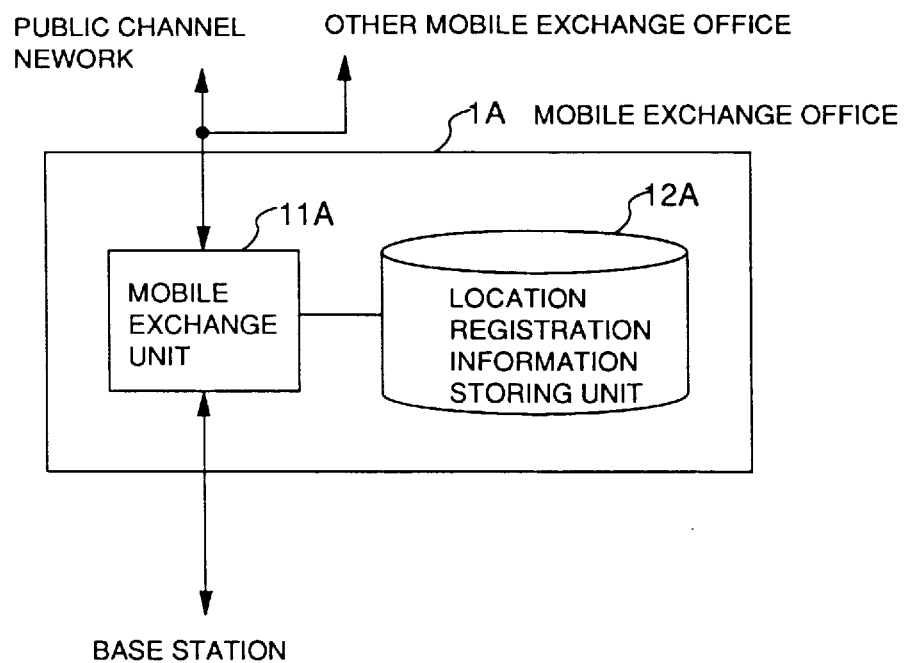
FIG. 11 is a block diagram showing a construction of a conventional mobile exchange office.
Figure 12:
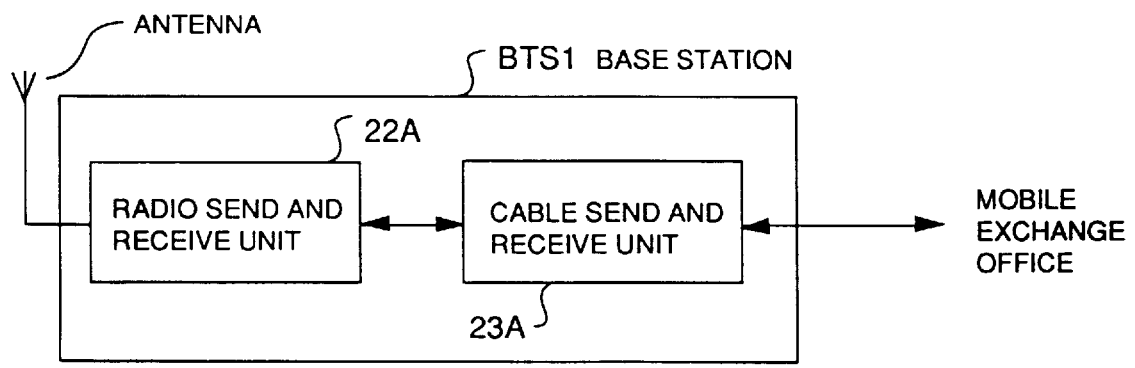
FIG. 12 is a block diagram showing a construction of a conventional base station.
Figure 13:
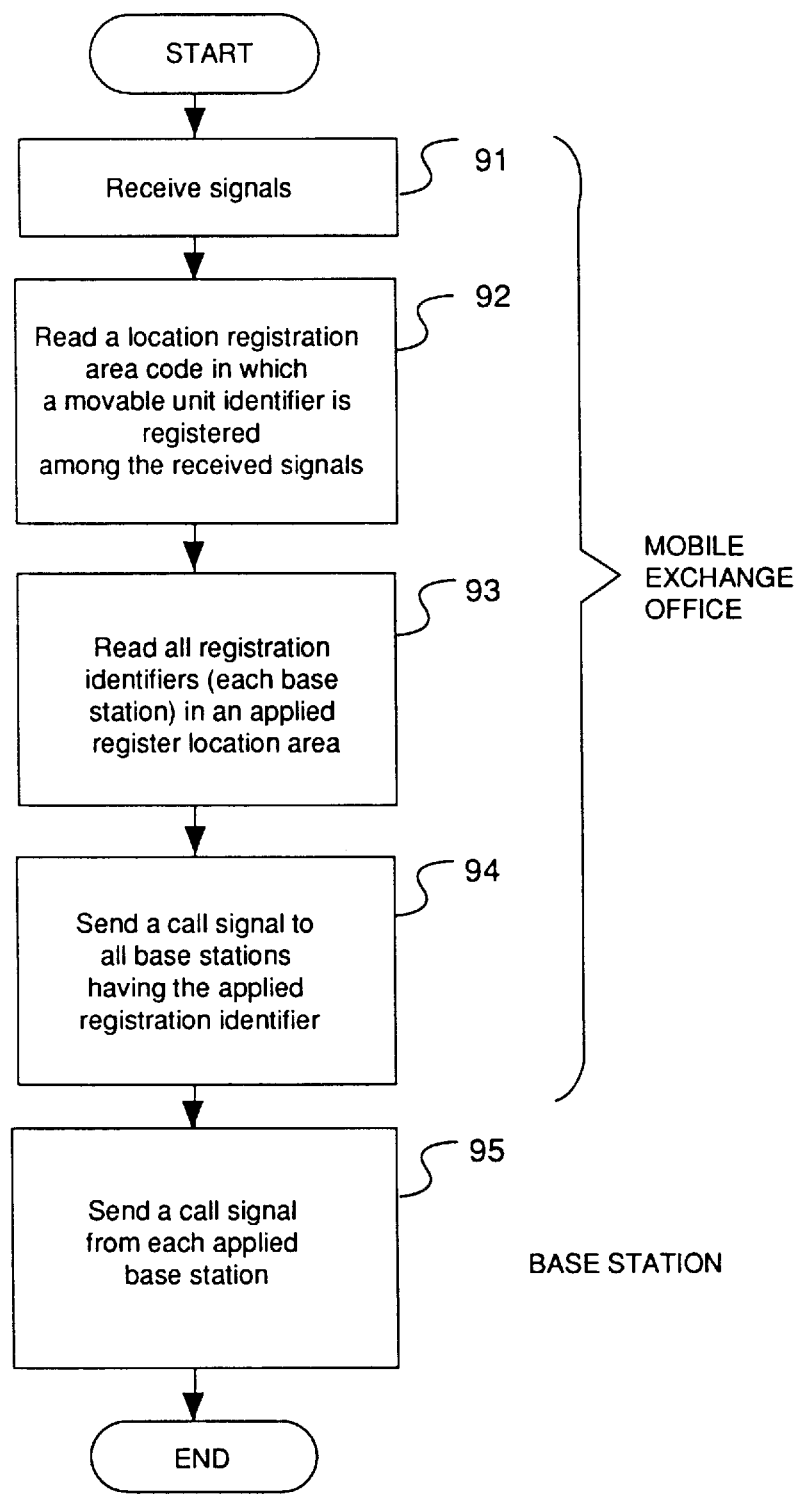
FIG. 13 is a flowchart showing a conventional calling process.
Figure 14:
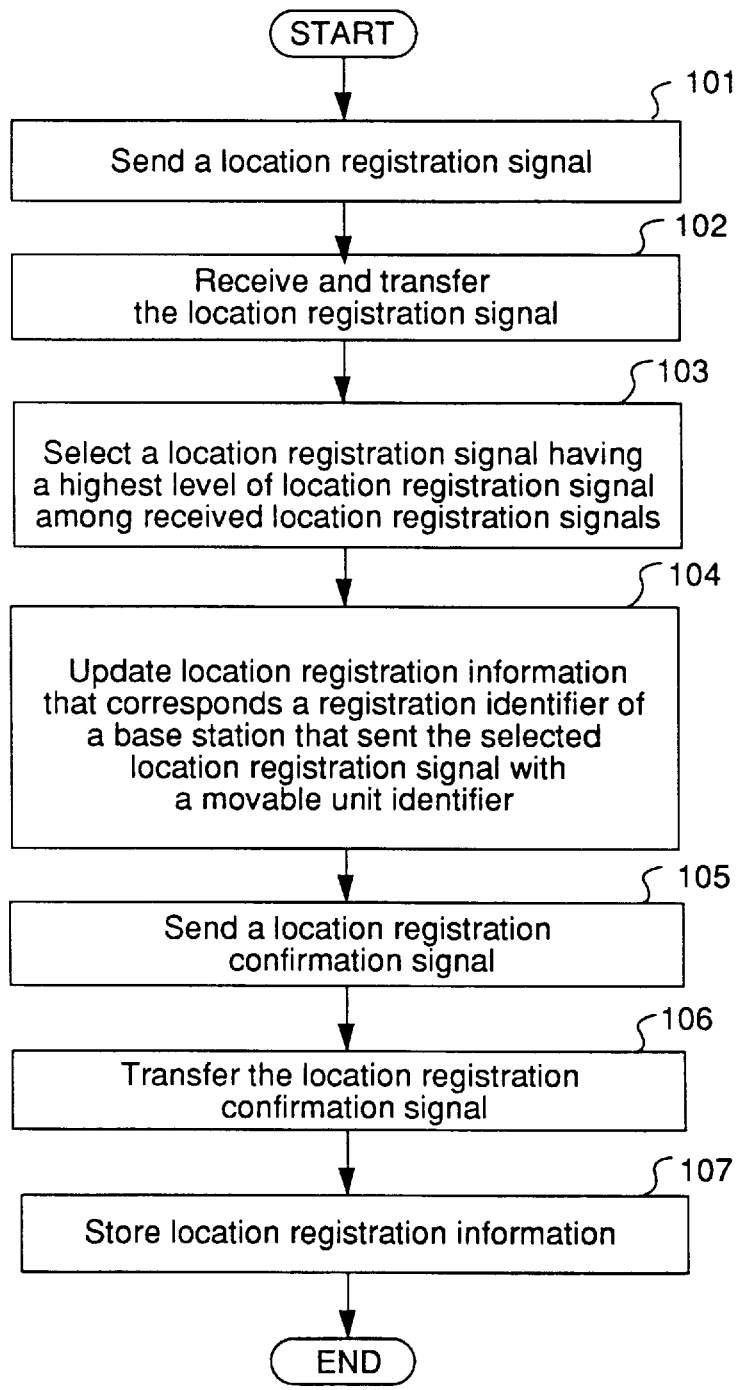
FIG. 14 is a flowchart showing a conventional location registration process.
Figure 15:
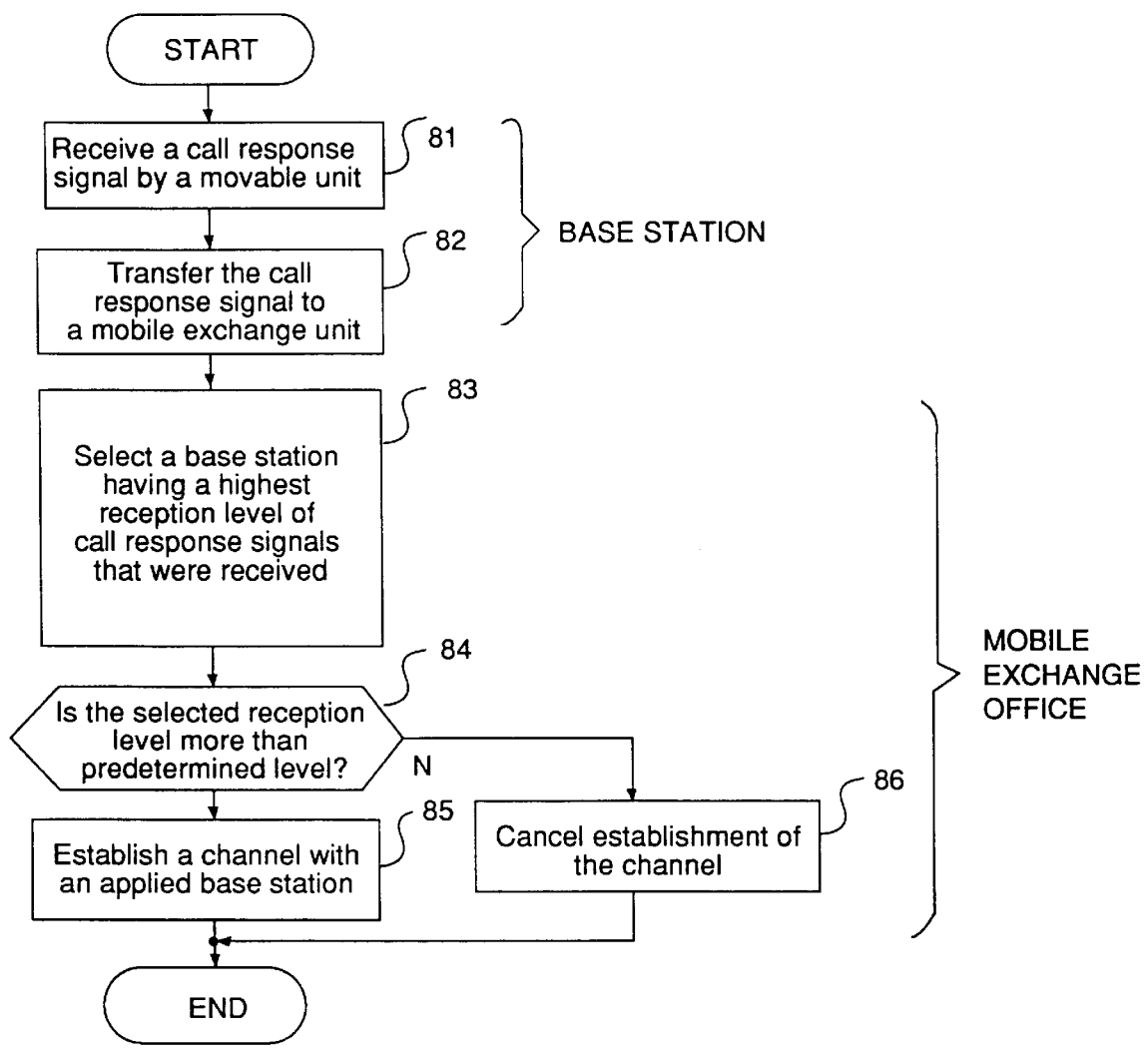
FIG. 15 is a flowchart showing a conventional channel set process.

FIG. 9 is a flowchart showing a location registration process of the present embodiment.

It is assumed that a mobile exchange office 1 calls a mobile terminal 4 upon receiving the call addressed thereto from outside. As FIG. 1 shows, the mobile terminal 4 is assumed to present be in a location registration area including the radio zone of the base station BS2.

When the mobile exchange office 1 receives a call from the public channel network 3 or other mobile exchange office 2 (step 61), the mobile exchange unit 11 receives the call and reads out a registration identifier allocated to the base station corresponding to the registration identifier of the addressed mobile terminal 4 which has been contained in the received signal by detecting the stored content of the location registration information storing unit 12 (step 62). The identifier of the base station corresponding to the mobile terminal identifier IMS1 of the mobile terminal 4 is IBS2.

The mobile exchange unit 11 sends a call signal to the base station BS2 having the registration identifier IBS2 which has been read out (step 63). At this time the mobile exchange unit 11 adds information to the call signal the identifying sender as the mobile exchange office 1 signal.

Upon receiving the call signal, the cable send and receive unit 23 of the base station BS2 determines whether or not it is addressed to its own station (step 64). If the call signal is addressed to its own station, the call signal is output to the call signal transfer unit 25.

The call signal transfer unit 25 determines whether an input call signal has been sent from the mobile exchange office 1 or another base station (step 65).

If the call signal has been sent from the mobile exchange office 1, registration identifiers IBS1 and IBS3 are read out from other base stations by detecting stored content of the location registration area information storing unit 24. Then a call signal is sent to the base stations BS1 and BS3 having registration identifiers IBS1 and IBS3, respectively via the cable send and receive unit 23 (step 67). The call signal transfer unit 25 adds information identifying the sender as the base station BS2 to the call signal. The call signal is outputted to the radio send and receive unit 22 of its own station (step 66).

If the other base station is determined as the sender, the call signal is outputted to the radio send and receive unit 22 of its own station (step 66).

Next, location registration process of the mobile terminal and location registration information updating in the mobile exchange office are described referring to FIG. 9.

It is assumed that the mobile terminal 4 executes location registration.

Moving out of a predetermined location registration area to its adjacent location registration area, the mobile terminal 4 outputs a location registration signal in the same manner as a conventional mobile communication system (step 71).

The location registration signal accommodates registration identifiers of the base station (e.g., BS2) where the mobile terminal 4 locates (e.g.,BS2) and other base stations (e.g., BS1, BS3 and BS5) which have received the location registration signal as additional information. The location registration signal is, then, transferred to the mobile exchange office 1 (step 72).

Receiving these location registration signals, the mobile exchange unit 11 compares each level of the location registration signal and selects the one at the highest level (step 73).

The mobile exchange unit 11 determines that the mobile terminal 4 locates in the radio zone of the base station which has sent the selected location registration signal at the highest level and further stores the location registration information by updating into the one representing the correlation between the registration identifier of the determined base station and the mobile terminal identifier of the mobile terminal 4 (step 74).

The mobile exchange unit 11 generates a location registration signal addressed to the mobile terminal 4 and outputs a location registration confirmation signal to the base station which has sent the location registration signal at the highest level (step 75).

Receiving the location registration confirmation signal, the base station transfers the received location registration confirmation signal to the mobile terminal 4 (step 76).

Receiving the location registration confirmation signal, the mobile terminal 4 identifies as to which location registration area it is currently registered by referring the location registration area information contained in the location registration confirmation signal. The information is further stored in the mobile terminal 4 (step 77).

A series of processes of the mobile terminal upon receiving the call signal starting from outputting the calling response signal until channel connection are the same as those shown in the drawings, thus, explanations are omitted.

This embodiment employs 1 set of the mobile terminal, 3 location registration areas and 3 radio zones contained in the location registration area. However, it is obvious that they may be set to desired numbers.

What is claimed is:

1. A method for calling a mobile terminal in a mobile communication system with a plurality of radio zones, each of said radio zones has a base station, said method comprising the steps of:

making a base station store identifiers of predetermined base stations except for its own identifier;

making a mobile exchange office, controlling said plurality of base stations, store an identifier of a mobile terminal and an identifier of a base station where these two identifiers correspond to each other;

making said mobile exchange office search an identifier of a mobile terminal from among stored identifiers when said mobile exchange office has received a call signal for said mobile terminal;

making said mobile exchange office search an identifier of a base station corresponding to said searched identifier for said mobile terminal, from among said stored identifiers;

making said mobile exchange office send said call signal for said mobile terminal to said base station having the corresponding identifier;

making said base station discriminate a sender of said call signal as said mobile exchange office or another base station, when said base station has received said call signal;

making said base station call said mobile terminal in a radio zone belonging to said base station and transferring said call signal to another base station whose identifier is stored therein; and making said other base station call said mobile terminal in a radio zone belonging to said other base station when a sender of said call signal is said base station.

2. The method for calling a mobile terminal in a mobile communication system of claim 1, wherein said step of making said mobile exchange office store an identifier of a base station further comprising a step of setting a plurality of location registration areas, each of said location registration areas including at least one said radio zone, and updating an identifier of a base station corresponding to an identifier of said mobile terminal stored in said mobile exchange office when said mobile terminal has moved from a predetermined location registration area to another location registration area.

3. The method for calling a mobile terminal in a mobile communication system of claim 2, wherein said step of updating an identifier of said base station further comprises steps of:

making a mobile terminal send a location registration signal when said mobile terminal has moved from a predetermined location registration area to another location registration area;

making a base station transfer said location registration signal added by an identifier of said base station to said mobile exchange office when said base station has received said location registration signal;

making said mobile exchange office discriminate a location registration signal having a highest reception level from among received location registration signal; and updating an identifier of a base station corresponding to an identifier of said mobile terminal stored in said mobile exchange office.

4. The method for calling a mobile terminal in a mobile communication system of claim 1, wherein said call signal to be sent from a mobile exchange office to a base station is added with an identifier indicating that a sender is said exchange office.

5. The method for calling a mobile terminal in a mobile communication system of claim 1, wherein said call signal to be transferred from a base station to another base station is added with an identifier indicating that a sender is said base station.

6. A method for calling a mobile terminal in a mobile communication system with a plurality of radio zones, each of said radio zones has a base station and a plurality of location registration areas, each of said location registration areas including at least one said radio zone, said method comprising the steps of:

making each base station in each radio zone store identifiers of predetermined base stations except for its own identifier;

making a mobile exchange office, controlling said plurality of base stations, store an identifier of a mobile terminal and an identifier of a base station in a location registration area where said mobile terminal belongs, wherein these two identifiers correspond to each other;

making said mobile exchange office update an identifier of a base station corresponding to an identifier of said mobile terminal when said mobile terminal has moved from a predetermined location registration area to another location registration area;

making said mobile exchange office search an identifier of a mobile terminal from among said stored identifiers and making said mobile exchange office search an identifier of a base station corresponding to said searched identifier from among said stored identifiers when said mobile exchange office has received a call signal for said mobile terminal;

making said mobile exchange office add to said call signal an identifier indicating that a sender is said mobile exchange office;

said mobile exchange office send said call signal added by said identifier;

making a base station discriminate a sender of said call signal based on said identifier of said call signal when said base station has received said call signal;

making said base station call said mobile terminal in a radio zone belonging to said base station, add an identifier indicating that a sender is said base station to said call signal and transfer said call signal to an other base station whose identifier is stored when a sender of said call signal is said mobile exchange office; and making said other base station call said mobile terminal in a radio zone belonging said other base station when a sender of said call signal is said base station.

7. The method for calling a mobile terminal in a mobile communication system of claim 6, wherein said step of making said mobile exchange office update an identifier of said base station further comprises steps of:

making a mobile terminal send a location registration signal when said mobile terminal has moved from a predetermined location registration area to another location registration area;

making a base station add an identifier of which sender is said base station to said location registration signal and transfer said location registration signal added by said identifier to said mobile exchange office when said base station has received said location registration signal;

making said mobile exchange office discriminate a location registration signal having a highest reception level from among received location registration signal; and making said mobile exchange office update an identifier of a base station corresponding to said mobile terminal sending said location registration signal to an identifier of a base station of which location registration signal has a highest reception level.

8. A mobile communication system having a plurality of base stations provided in respective radio zones and a mobile exchange office for controlling said plurality of base stations, and calling a mobile terminal via said base station when said mobile exchange office has received a call signal for said mobile terminal, said mobile communication system comprising;

said mobile exchange office comprising:

mobile exchange office storing means for storing an identifier of each mobile terminal and an identifier of a base station, wherein these two identifiers are corresponding to each other; and means for searching for an identifier of a base station corresponding to an identifier of a mobile terminal from said mobile exchange office storing means when having received a call signal for said mobile terminal, and sending said call signal for said mobile terminal to a base station whose identifier has been searched; and said base stations, each of said base stations comprising:

base station storing means for storing identifiers of said base stations except for its own identifier;

means for discriminating a sender of a call signal as said mobile exchange office or another base station; and means for transferring said call signal to a base whose identifier is stored in said base station storing means and calling a mobile terminal in a radio zone belonging to said base station when a sender of said call signal is said mobile exchange office, and calling said mobile terminal in a radio zone belonging to said base station when a sender of said call signal is a base station except said base station.

9. The mobile communication system of claim 8, including said mobile communication system with a plurality of location registration areas, each of said location registration areas including at least one said radio zones, said mobile communication system comprising:

said mobile terminal comprising means for sending a location registration signal when said mobile terminal has moved from a predetermined location registration area to another location registration area;

said each base station comprising means for receiving said location registration signal, adding own identifier to said registration signal and transferring the result to said mobile exchange office; and said mobile exchange office comprising:

means for discriminating a location registration signal of which reception level is highest from among received location registration signals; and means for updating an identifier of a base station corresponding to a mobile terminal that has sent said location registration signal to an identifier of a base station that has sent said location registration signal of which reception level is highest.

10. The mobile communication system of claim 8, wherein said mobile exchange office comprises means for adding an identifier indicating that a sender is a mobile exchange office to said call signal to be sent to a base station.

11. The mobile communication system of claim 8, wherein said each base station comprises means for adding an identifier indicating that a sender is a base station to said call signal to be sent to another base station.

12. A mobile communication system having a plurality of base stations provided in respective radio zones and a mobile exchange office controlling said plurality of base stations, being provided with a plurality of location registration areas including at least one said radio zones and calling a mobile terminal via said base station when said mobile exchange office has received a call signal for said mobile terminal, said mobile communication system comprising:

said mobile terminal comprises means for sending a location registration signal when moving from a determined location registration area to another location, each of said base stations comprising:

base station storing means for storing a predetermined identifier of each base station except for an identifier of its own base station;

means for discriminating a sender of a call signal;

means for transferring said call signal to a base station whose identifier is stored in said base station storing means and calling a mobile terminal in a radio zone belonging to said base station when a sender of said call signal is said mobile exchange office, and calling said mobile terminal in a radio zone belonging to said base station when a sender of said call signal is a base station except said base station; and means for receiving said location registration signal, adding its own identifier to said location registration signal and transferring the result to said mobile exchange office; and said mobile exchange office comprising:

mobile exchange office storing means for storing an identifier of each mobile terminal and an identifier of a base station corresponding to said each mobile terminal, wherein these two identifiers correspond to each other;

means for discriminating a location registration signal whose reception level is highest from said received location registration signals;

means for updating an identifier of a base station corresponding to a mobile terminal that has sent said location registration signal stored in said mobile exchange office storing means to an identifier of a base station that has sent said location registration signal having the highest reception level; and means for receiving a call signal for a mobile terminal, searching an identifier of a base station corresponding to an identifier of said mobile terminal from identifiers stored in said mobile exchange office storing means, and sending said call signal for said mobile terminal to a broadcasting station whose identifier has been searched.

* * * * *